United States Patent
Popov et al.

(10) Patent No.: US 12,047,223 B2
(45) Date of Patent: Jul. 23, 2024

(54) MONITORING SERVICE HEALTH STATUSES TO RAISE ALERTS

(71) Applicant: SAP SE, Walldorf (DE)

(72) Inventors: Hristo Mitkov Popov, Sofia (BG); Radoslav Ivanov Dzhupanov, Sofia (BG); Jane Zhivkova Savova, Sofia (BG); Boyan Yosifov Tomov, Sofia (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/071,812

(22) Filed: Nov. 30, 2022

(65) Prior Publication Data
US 2024/0179044 A1 May 30, 2024

(51) Int. Cl.
*H04L 41/0631* (2022.01)
*H04L 41/0654* (2022.01)
*H04L 41/069* (2022.01)

(52) U.S. Cl.
CPC ...... *H04L 41/0631* (2013.01); *H04L 41/0654* (2013.01); *H04L 41/069* (2013.01)

(58) Field of Classification Search
None
See application file for complete search history.

(56) References Cited

U.S. PATENT DOCUMENTS

| | | | |
|---|---|---|---|
| 7,738,377 B1 | 6/2010 | Agostino et al. | |
| 10,469,986 B1 | 11/2019 | Agarwal et al. | |
| 10,560,309 B1* | 2/2020 | Chitalia | H04L 41/40 |
| 10,812,319 B1* | 10/2020 | Prakash | H04L 41/046 |
| 11,048,598 B2 | 6/2021 | Neichev et al. | |
| 11,627,034 B1* | 4/2023 | Chawathe | H04L 41/0631 709/224 |
| 11,663,109 B1 | 5/2023 | Deaderick et al. | |
| 2015/0227100 A1 | 8/2015 | Uwatoko | |
| 2015/0280968 A1 | 10/2015 | Gates et al. | |
| 2015/0304158 A1* | 10/2015 | Dharmadhikari | H04L 41/046 714/37 |

(Continued)

OTHER PUBLICATIONS

U.S. Appl. No. 18/071,825, filed Nov. 30, 2022, Popov et al.

(Continued)

*Primary Examiner* — Philip J Chea
*Assistant Examiner* — James Ross Hollister
(74) *Attorney, Agent, or Firm* — Fish & Richardson P.C.

(57) ABSTRACT

The present disclosure relates to computer-implemented methods, software, and systems for data processing to monitor and trigger alerts based on identified technical issues at instances running in a cloud platform environment. Availability data for the cloud platform can be collected. Based on evaluation of the availability data, a determination that at least a portion of a set of services are experiencing issues can be made. A detailed check is triggered to collect data logs, metrics, and dependencies data for at least the portion of the set of services. An overall status of performance of the cloud platform based on obtained service status data from the detailed check can be determined. Based on analysis of the overall status of performance of the cloud platform, execution of causal engine logic to identify an issue at the cloud platform can be performed, and a notification for the issue can be provided.

21 Claims, 11 Drawing Sheets

(56) References Cited

U.S. PATENT DOCUMENTS

| | | | |
|---|---|---|---|
| 2016/0019534 A1 | 1/2016 | Sidhu et al. | |
| 2016/0112245 A1* | 4/2016 | Mankovskii | H04L 41/069 709/204 |
| 2017/0063659 A1* | 3/2017 | Platon | H04L 45/20 |
| 2018/0276063 A1* | 9/2018 | Mendes | G06F 11/3409 |
| 2019/0007290 A1 | 1/2019 | He et al. | |
| 2020/0145299 A1* | 5/2020 | Do | H04L 41/0816 |
| 2020/0184355 A1 | 6/2020 | Mehta et al. | |
| 2020/0409810 A1* | 12/2020 | Wu | G06F 11/2257 |
| 2021/0203563 A1 | 7/2021 | George et al. | |
| 2022/0255822 A1 | 8/2022 | Yousouf et al. | |
| 2022/0292008 A1 | 9/2022 | Kavali et al. | |
| 2022/0417106 A1 | 12/2022 | Wozich et al. | |
| 2023/0165539 A1 | 6/2023 | Toth et al. | |
| 2023/0305944 A1* | 9/2023 | Biswas | G06F 11/3612 717/125 |

OTHER PUBLICATIONS

Jenkins.io [online], "Pipeline Best Practices" Feb. 2021, retrieved on Oct. 25, 2022, retrieved from URL <https://www.jenkins.io/doc/book/pipeline/pipeline-best-practices/>, 7 pages.

Extended European Search Report in European Appln. No. 22211849.9, mailed on Aug. 22, 2023, 11 pages.

* cited by examiner

MONITORING SERVICE HEALTH STATUSES TO RAISE ALERTS

CROSS-REFERENCE TO RELATED APPLICATIONS

This application is related to and filed together with U.S. application Ser. No. 18/071,825, filed on Nov. 30, 2022, titled "DEGRADATION ENGINE EXECUTION TRIGGERING ALERTS FOR OUTAGES", now issued as U.S. Pat. No. 11,929,867 on Mar. 12, 2024, the contents of which are hereby incorporated by reference.

TECHNICAL FIELD

The present disclosure relates to computer-implemented methods, software, and systems for the execution of monitoring and alert processing for technical issues identified in a cloud environment.

BACKGROUND

Customers' needs are transforming and imposing higher requirements for process execution, lifecycle management, and technical landscape that also support high availability to access software resources provided by underlying platforms. Cloud environments may experience network connectivity disruptions, hardware failures, and other technical issues affecting responsiveness of running software applications, services, and databases. Disruptions at the cloud environments may be associated with disruptions of services provided to external entities by the databases, applications, services, and/or end users.

SUMMARY

The present disclosure involves systems, software, and computer implemented methods for data processing to monitor and trigger alerts based on identified technical issues at instances running in a cloud platform environment. The present disclosure relates to identifying trends in the behavior of execution of services in the cloud platform environment and support alert triggering for expected outages prior their occurrence.

One example method may include operations such as integration calls with various monitoring tools, to then process the data and take informed decision about the situation and send alert.

Other implementations of this aspect include corresponding systems, apparatus, and computer programs, configured to perform the actions of the methods, encoded on computer storage devices.

Implementations can optionally include third party monitoring systems as long as they provide valuable data.

In some instances, log scanning is implemented to capture specific scenarios about service health.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
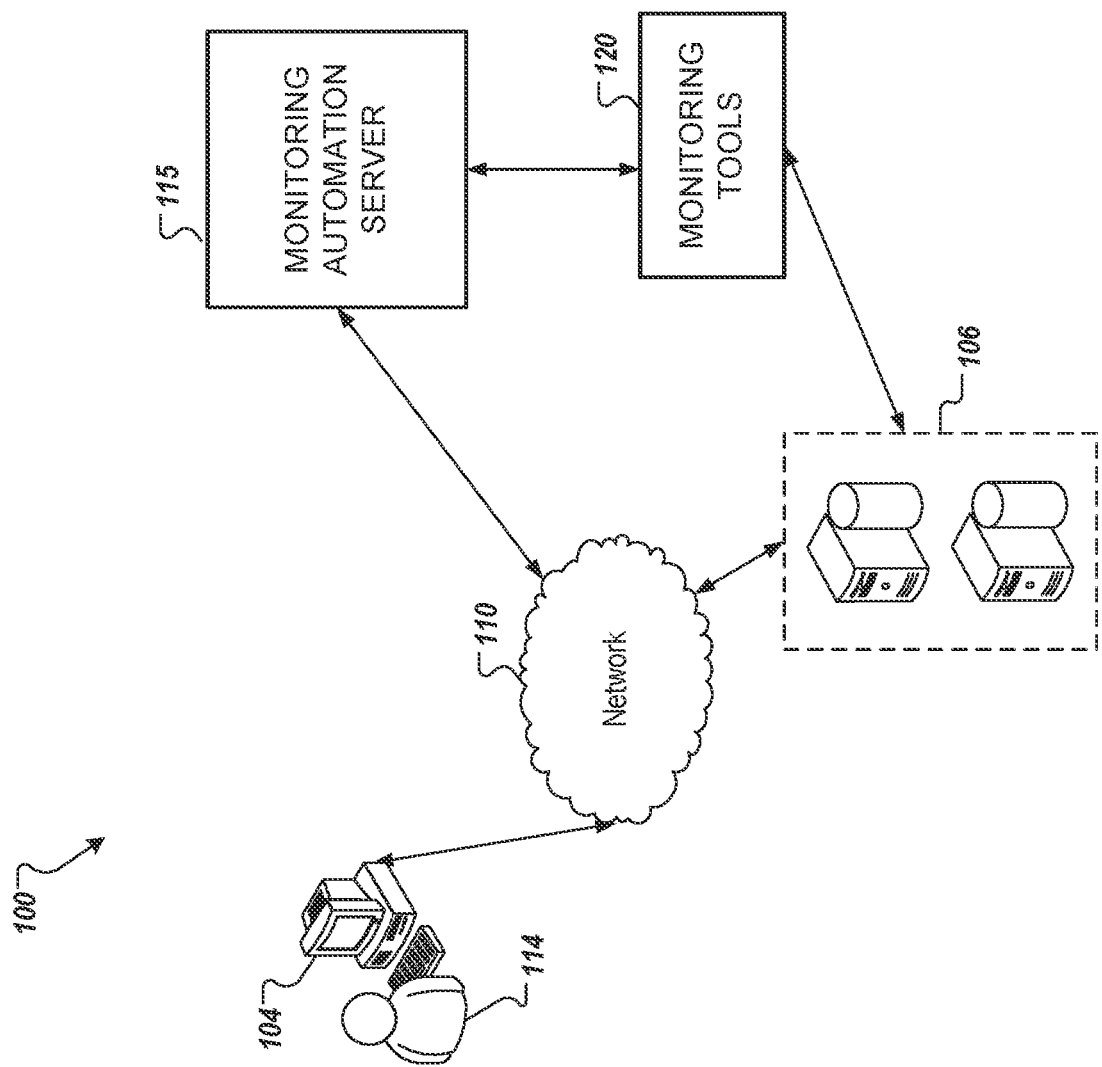
FIG. 1 illustrates an example computer system architecture that can be used to execute implementations of the present disclosure.

The present disclosure describes various tools and techniques for data processing to monitor and trigger alerts based on identified technical issues at instances running in a cloud platform environment.

In some implementations, a cloud platform can include multiple data centers (or availability zones) that host applications and/or systems. The cloud platform can provide central components (e.g., platform services, core services, centralized storage systems, and others) at each or some of the data centers, where the central components provide shared operations and functionality to the applications and systems associated with the cloud platform. The applications that can run on the cloud platform can include software applications, application systems, application services, databases, storage, or other entities that can run on the underlying infrastructure of the cloud platform.

In some implementations, applications running at one data center consume services and resources from central components running at the same data center. An application running at a data center of the cloud platform can be communicatively coupled with some or all of the central components at that data center. In some instances, an application running at one data center can consume services from a central component at another data center.

A cloud platform may experience disruptions in the network connectivity or availability. Such disruptions may be relevant for some or all portions of the cloud platform (e.g., a given data center or a set of data centers) or at certain entities running on the cloud platform (e.g., applications or services). The disruptions can be caused by various reasons, and some issues may propagate to other portions or entities on the cloud platform based on inheritance due to interconnections and/or correlations. For example, if an application's execution is dependent on logic executed at another entity running at a data center that is having a network outage, the application can also experience downtime or other disruptions, limited functionality, or errors.

In some instances, a disruption may be caused by a failure in the underlying hardware and/or infrastructure where the cloud platform is hosted. The disruptions may affect part of or the whole of the cloud platform. In some instances, the disruptions may affect some or all connection types associated with the cloud platform, such as internal connections between entities on the same data center, between entities across different data centers, and external connectivity to instances at other environments outside the cloud platform.

A disruption in the connectivity may be associated with an outage having a particular scope and affecting connections of certain type(s) (e.g., some or all of the connection types) associated with the cloud platform. In some instances, a disruption in the network connectivity at a cloud platform may affect the execution of entities including applications, services, service components, and databases, as well as other entities that can be hosted on the cloud platform. In some of those instances, a disruption in the network connectivity may result in the unavailability of services and/or communication gaps that can lead to poor performance of platform-provided services. Even a disruption to a single aspect of the cloud platform or availability zone may cause issues that reverberate throughout related applications, services, and/or systems.

In order to provide services with high availability, the entities running on the cloud platform must be accessible from the outside, able to access external services, resources, or other entities, and able to communicate with other entities running within the same cloud platform. Thus, if a service experiences issues, such as network connectivity issues, the quality of the services provided by entities running on the cloud platform may be affected. To maintain applications, services, and database(s) having a requirement for high availability, the cloud platform can be provided with tools and techniques to identify issues, determine whether recovery measures are necessary and available, and invoke logic to perform a recovery operation that can support recovery from the identified issue(s).

In some implementations, the performance of applications running on a cloud platform can be tracked and tickets (or issue data) can be logged in a tracking system (e.g., a ticketing system) to collect data for experienced health issues. In some implementations, the tracked issue data can be processed (e.g., by a recovery service or a system administrator) to determine recovery actions to remedy issues experienced at relevant applications. In some instances, automated remediation actions can be implemented for identified issues and/or for predicted issues based on monitored trends in a cloud landscape.

In some implementations, the experienced health issues by an application running at a data center of a cloud platform can be associated with internal application issues, such as bugs or issues of the implemented application logic or caused due to disruptions (or interruptions) in the services provided by one or more central components that are invoked by the application.

In some implementations, the instances running on the cloud platform, including central components and/or individual applications, can experience health issues, such as network failures, service disruptions, or connectivity issues, among other examples. For example, while different applications can track separate issues (e.g., as tickets at a ticketing system of a data center), the root causes for those issues can be the same. For example, a central component consumed by all of the applications, or one of its individual components or functionalities, may be experiencing downtime. Thus, issues experienced by a central component can be propagated to other entities running on the cloud platform.

Since availability of entities running on the cloud platform can be adversely affected by technical issues, such as network connectivity disruption, unavailability, delayed processing, monitoring of a health status of the cloud platform can be performed to dynamically determine changes in the cloud platform and identify issues at services running on the cloud platform. In some instances, experienced issues at central components of the cloud platform can propagate towards other customer applications and escalate over time.

In response to determining a change in a system behavior or identifying some issues at monitored services on a cloud platform, a notification for an issue (e.g., a network connection failure of a database component) can be provided to a relevant party that can handle analyzing and remedying the issue. For example, in response to determining a network failure, affected connection types may be determined and corresponding parts (e.g., network segments or availability zones) within the cloud platform that are associated with the network failure can be located. In response to monitoring accessibility of different services and/or groups of services running on the cloud platform, notifications about outages due to identified issues can be provided and appropriate countermeasures can be suggested and/or undertaken, in some cases, automatically.

A monitoring server for detecting disruptions or issues associated with one or more entities running on the cloud platform may be provided. Monitoring the availability of different services or parts of the cloud platform can be performed by obtaining information from monitors that observe the health status of entities running on the cloud platform and/or by obtaining health statuses based on direct checks for some or all entities on the cloud platform that may be associated with identified issues at the cloud platform.

FIG. 1 depicts an example architecture 100 in accordance with implementations of the present disclosure. In the depicted example, the example architecture 100 includes a client device 104, a network 110, a cloud environment 106, monitoring tools 120, and a monitoring automation server 115. The cloud environment 106 may include one or more server devices and databases (e.g., processors, memory). In the depicted example, a user 114 interacts with the client device 10

In some examples, the client device 102 and/or the client device 104 can communicate with the cloud environment 106 over the network 110. In some implementations, the cloud environment 106 can be considered as a data center (or availability zone) of one cloud platform, where the cloud platform can include one or multiple data centers (or availability zones).

The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 includes at least one server and at least one data store. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on virtual machines (VMs) hosted on cloud infrastructure. In some instances, one application and/or service can run as multiple application instances on multiple corresponding VMs, where each instance is running on a corresponding VM. In some instances, a service hosted on the cloud can include service components that execute specific tasks for maintaining performance of the service. Each of the instances of the service may include a corresponding instance of each service component. In some case, the service components can be associated with the core or central services provided by the cloud platform.

In the cloud environment 106, a service can run at a data center (or cluster, or an availability zone) of the cloud environment 106 to provide end-user services, which can include, for example, services associated with requests sent through the network 110 from user 114 over device 104. The applications and the databases that are running in the cloud environment 106 can be designed, developed, executed, and maintained in relation to different customers and based on configured accounts that define process execution in relation to the applications and the database.

In some instances, the cloud environment 106 may be configured in a multiple availability zone architecture. The cloud environment 106 may be configured to include multiple availability zones where one application may include multiple instances running in corresponding multiple availability zones. By executing applications, services, databases, and other examples of entities that can run on cloud platform in a multiple availability zone setup, high availability for provided services and data is maintained. Maintaining a cloud platform with multiple availability zones supports providing low-latency network connectivity between different instances of applications executed at multiple zones. In some implementations, central components providing core platform services, central customer services, or specialized platform services can be consumed by customer applications that are run in the cloud environment 106.

In some instances, the cloud environments 106 may host at least some applications, service, and databases, which are associated with different customers and/or accounts, or with the platform provider, and may be configured to interact in a particular way. In some implementations, hosted applications, services, and databases can consume services provided by other applications, services, and databases, thus forming a process chain and interconnection during process execution. Such communicatively coupled applications may experience technical issues that originate from their individual implemented logic or based on issues experienced during communication or during interaction with other entities that they consume (e.g., connectivity issues, performance issues, downtime, hardware failure, and others).

In some implementations, the cloud environment 106 can be configured with monitors at the monitoring tools 120 that are instantiated to collect data for services and/or applications running on the cloud environment 106. In some implementations, a monitoring automation server 115 can be implemented to gather information for monitoring of some or all services on the cloud environment 106 and to trigger alerts or report issues based on analyzing the obtained data. In some implementations, the monitoring tools 120 are used to collect data for the performance of entities running on the cloud environment 106 and for the cloud environment 106 as a whole (e.g., including infrastructure performance metrics). In various implementations, the monitoring tools 120 can be external to the cloud environment 106, internal to the cloud environment 106 (not shown on FIG. 1), or a combination of both internal and external tools to monitor the performance of the cloud environment 106.

In some implementations, the monitoring automation server 115 can collect monitoring data from the monitoring tools 120 to determine issues at or with services and process the issues to apply respective countermeasures. In some instances, the monitoring automation server 115 may perform periodic calls to obtain general availability status information for the cloud environment 106, and, if an indication for an issue is identified, perform a further detailed check for specific statuses of entities associated with the determined general availability issues to identify root causes for experienced issues.

Figure 2:
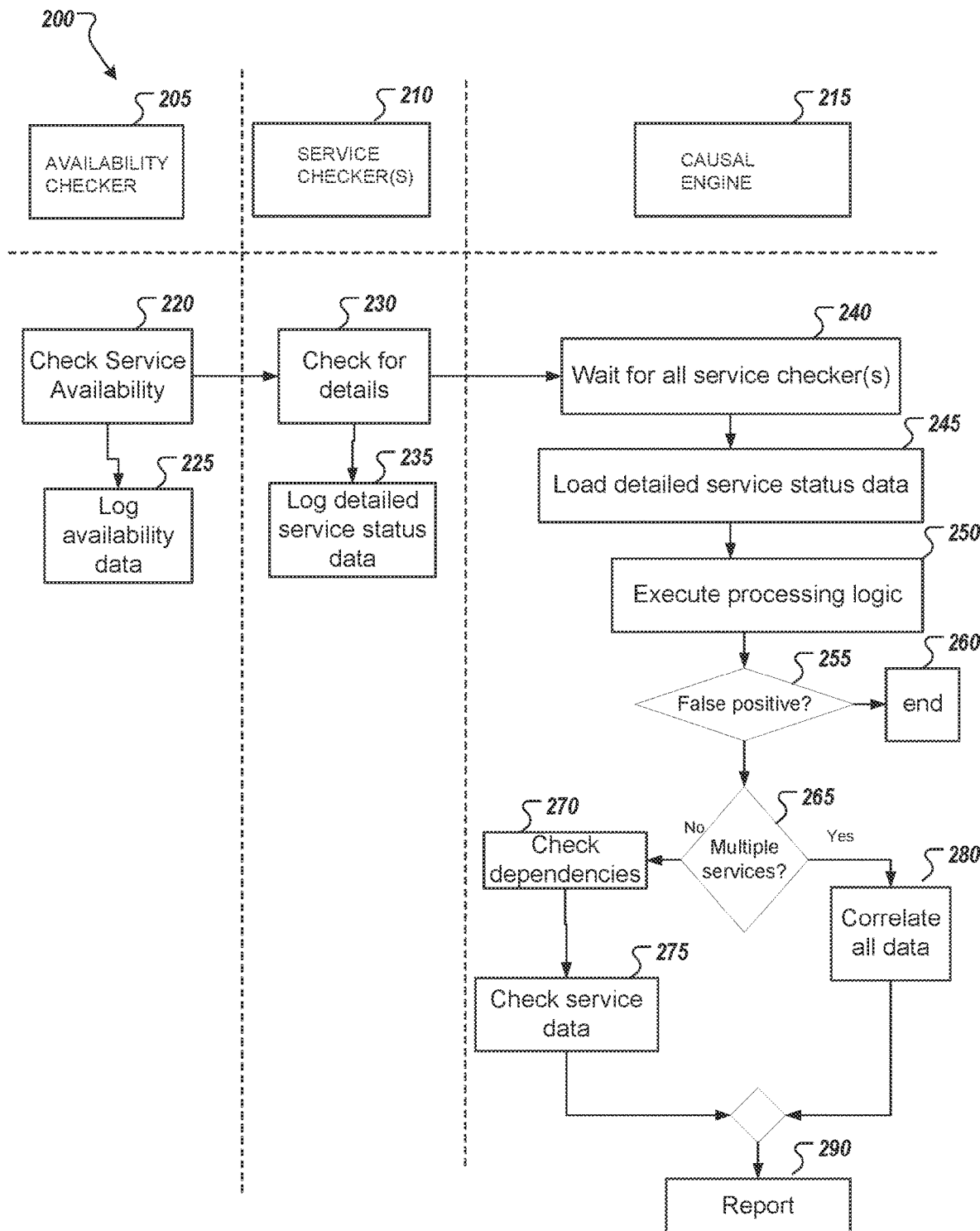
FIG. 2 is a sequence diagram for an example method for identifying technical issues at services running on a cloud platform and triggering alerts to remedy the technical issues in accordance with implementations of the present disclosure.

FIG. 2 is a sequence diagram for an example method 200 for identifying technical issues at services running on a cloud platform and triggering alerts to remedy the technical issues in accordance with implementations of the present disclosure. In some implementations, the cloud platform may be similar to the cloud environment 106 of FIG. 1. The cloud platform may be configured as one platform hosted at one physical location or may be configured in a multiple availability zone setup where multiple data centers corresponding to the presented cloud platform set up may form the whole cloud platform.

In some instances, the cloud platform can include multiple segments including a core segment, a services segment, a database (DB) segment, and an applications segment. The segments part of the cloud platform are network segments that are associated with entities of different types running at the cloud platform 210. In some instances, any entity running at the cloud platform can communicate with another entity running on the same cloud platform unless there are access restrictions configured for the entities that are outside of the general network connectivity capabilities of the cloud platform.

In some implementations, to support monitoring of services (or other entities) running on the cloud platform, a monitoring server, such as the monitoring automation server 115, can be instantiated to integrate information from monitoring tools, such as the monitoring tools 120, and consolidate and process that information to determine a scope of an issue (e.g., an outage) and to correlate it with a root cause.

In some instances, the monitoring server can include an availability checker 205, service checker(s) 210, and a causal engine 215 that are communicatively coupled to determine issues at services running at a cloud platform, which can then report those issues to relevant entities (e.g., administrator, system user, issue tracking tool, ticketing system, or an automated remediation entity, among other suitable examples).

In some implementations, the monitoring server obtains and evaluates status data for the cloud platform as a whole and/or services that run on the cloud platform. The status data can be evaluated in stages, first, general availability data can be evaluated, and later, detailed service data can be evaluated. Thus, if the general availability data for services indicate that there are availability issues, the monitoring server can perform detailed service evaluation to determine an overall status of the landscape of the cloud platform and the services' performance in an efficient, yet reliable, manner.

In some implementations, the availability checker 205 performs checks of service availability for services running at a cloud platform at 220. For example, the service availability can be determined based on obtaining information from availability service monitors that are running on the cloud platform or are external to the cloud platform. Based on the performed checks, the availability status data is logged at 225, for example, at a service status log file. In some implementations, the performance of the checks at 220 can be substantially similar to the process described in relation to FIG. 5.

When an issue is found based on availability status checks (as performed at 220), a service checker can be called to performed detailed checks at 230. In some instances, a monitoring server can include one or multiple service checkers 210, which are configured to perform checks for one or a group of services running on the cloud platform. In some instances, when performing such checks, the service checkers 210 can contact monitoring tools that are either internal or external to the cloud platform, to obtain information for the status of those services.

In some implementations, multiple service checkers 210 perform detailed checks for different services on the cloud platform and log detailed service status data at 235. In some implementations, the detailed service status data can be logged in the same service status log file where the availability checker 205 has logged availability status data, while in others, the data can be logged at a separate storage or log file.

In some instances, the service checkers 210 that perform detailed checks are those service checkers 210 that are associated with services that can be recognized as unavailable based on the collected availability data obtained by the availability checker 205.

At 240, the causal engine 215 awaits all service checkers 210 to perform detailed checks (at 230). Once those checks are performed, the causal engine 215 can load, at 245, service status data from the logged detailed service status data 235. The service status can be represented as a binary string. At 250, the causal engine executes processing logic to evaluate the service status data as loaded and to determine whether there is a false positive indication for an issue.

If, at 255, it is determined that the service status data does not indicate an issue at a service on the cloud platform, the processing can be terminated, at 260, and a report for the false positive indication can be performed. If, however, at 255, it is determined that there is a service issue on the cloud platform, a further determination can be performed at 265 as to whether the issues are identified at one or multiple services on the cloud platform.

If, at 265, it is determined that there is only a single service associated with at least one issue, a dependency check is performed for that particular service at 270. Then, at 275, a check of the service data is performed. At 290, a status of the issue is reported. The status report can include an identification of the issue and a scope corresponding to the issue.

If, at 265, it is determined that multiple services are associated with at least one issue, the information for each of the services can be evaluated and correlated at 280 to determine a scope of the issues on the cloud platform. In some instances, based on correlating the service status data, dependencies between identified issues can be identified, and a root cause service can be determined. The dependency status can be represented as a binary string. Thus, based on an identified root cause, a scope of the issue at the cloud platform can be identified. In some instances, a service that is connected with a root cause can be consumed by other services, which might not be reported as affected with an issue, but may be expected to experience an issue due to an already existing issue at the root cause service. Thus, the scope of the issue can be evaluated based on the root cause analysis, as well as considerations for the dependencies and interrelations of services on the cloud platform. Based on the evaluation and correlation of the data at 280, an identified issue (and the scope of the issue) can be reported at 290.

Figure 3:
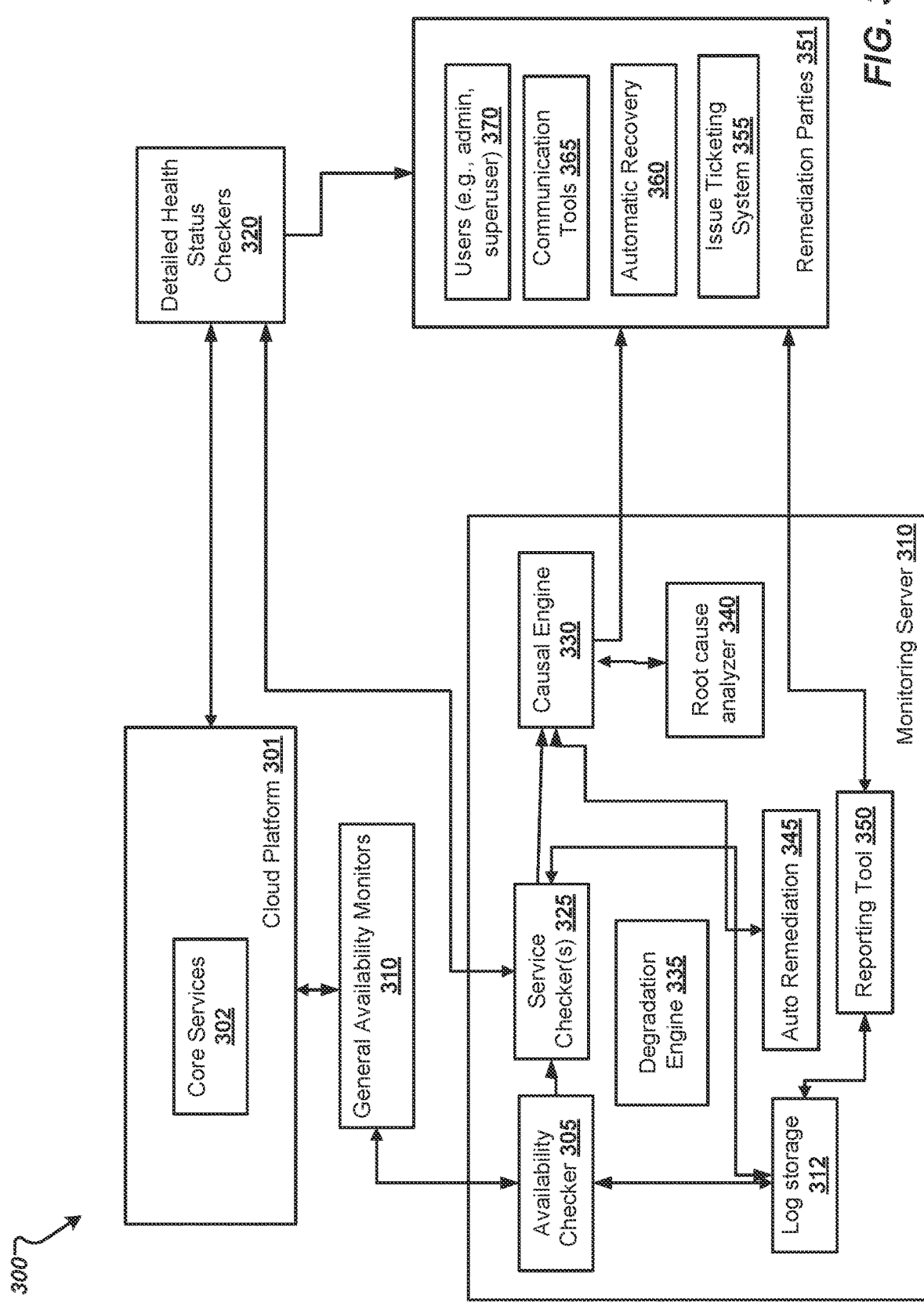
FIG. 3 is a block diagram for an example cloud platform environment configured with health status checkers running on a monitoring server for identifying technical issues at services running on a connected cloud platform in accordance with implementations of the present disclosure.

FIG. 3 is a block diagram for an example cloud platform environment 300 configured with various health status checkers running on a monitoring server for 310 identifying technical issues at services running on a connected cloud platform 301 in accordance with implementations of the present disclosure.

The example system 300 includes a cloud platform 301 that can be, in some instances, substantially similar to the cloud environment 106 of FIG. 1. The cloud platform 301 can provide core services 302 that can be consumed by customer applications or databases.

The cloud platform 301 is communicatively coupled with monitoring tools to monitor performance of services running on the cloud platform. The monitoring tools can be either internal or external monitoring tools, as well as a combination thereof, and may be similar to the monitoring tools 120 of FIG. 1. In some instances, the monitoring tools can be connected with a monitoring server 310, which may be similar to the monitoring automation server 115 of FIG. 1.

The monitoring tools can include general availability monitors 310 and detailed health status checkers 320. The monitoring server 310 can provide availability checker(s)

305, which can be configured to obtain data from the general availability monitors 310 to determine whether there are issues at one or more services on the cloud platform 301. If there are issues, availability checker(s) 305 can be configured to trigger execution of service checker(s) 325 to perform detailed checks of the health status of the services. The service checker(s) 325 can be configured to perform detailed checks based on communication with the detailed health status checker 320 that execute checks, for example, by monitoring the performance of the services on the cloud platform 301 (e.g., reading logs, metrics, checking for previously reported outages to match similarities). The obtained information from the service checker(s) 325 can be provided to a causal engine 330 to determine a root cause issue for the cloud platform.

In some implementations, the availability checker(s) 305, service checker(s) 325, and the causal engine 330 can be configured to communicate and execute processes to identify technical issues at services running on the cloud platform 301, and, if issues are identifying, to trigger alerts to remedy the technical issues in accordance with implementations of the present disclosure. The execution of the process to identify those issues and trigger alerts can, in some instances, be substantially similar to the described method 200 of FIG. 2. Further, the execution of checks by the availability checker(s) 305 to the general availability monitors 310 can optionally be substantially similar to the example process 500 of FIG. 5, described below. In those instances, the general availability monitors 310 can include the availability service 510, the direct check 515, and the network checker 520, as later described in FIG. 5. The check execution by the service checker(s) 325 to the detailed health status checkers 320 may be substantially similar to the example process 600 of FIG. 6. In those instances, the detailed health status checkers 320 can include the direct checks 610 application, the elastic checks 615, the get metrics application 620, and the efficiency tracker 625 as described later in FIG. 6. The availability checker(s) 305 and the service checker(s) 325 can store availability data and detailed service status data at a log storage (e.g., a status log file stored on storage system) 312, which may be substantially similar to the described logging of data at 225 and 235 of FIG. 2. The monitoring server 310 can include a reporting tool 350 that can be used to report health statuses of the cloud platform 301 and some or all of the services running on the cloud platform.

Figure 6:
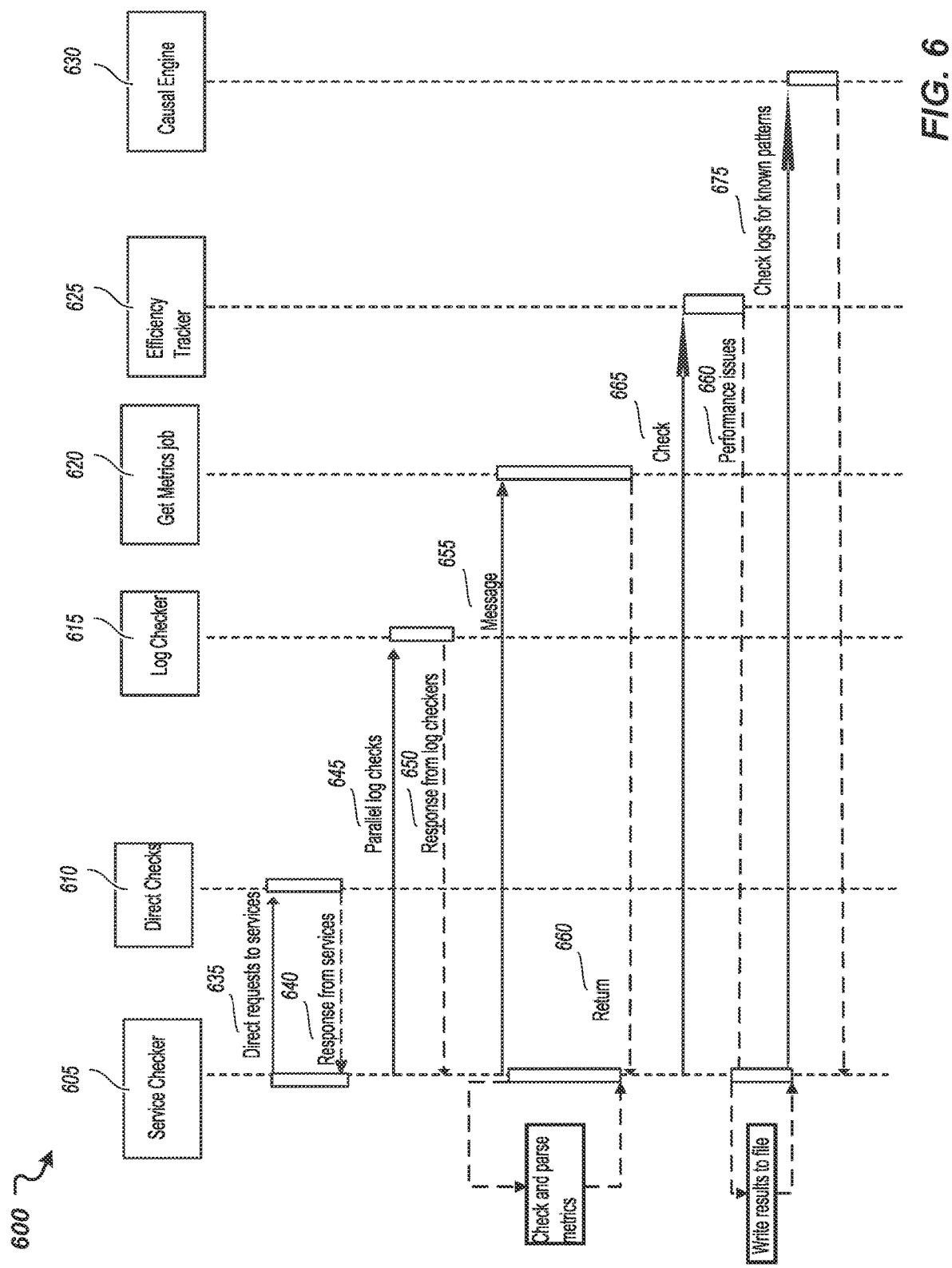
FIG. 6 is a sequence diagram for an example method for identifying a detailed health status of services running in a cloud platform to identify issues based on known patterns in accordance with implementations of the present disclosure.

The causal engine 330 may be substantially similar to the causal engine 215 of FIG. 2 and the causal engine 630 of FIG. 6. The causal engine 330 can communicate with a root cause analyzer 340 to determine a root cause of identified issues at services running on the cloud platform 301. The root cause analysis's execution can be substantially the same as the root cause analysis described in relation to FIG. 7.

In some implementations, the causal engine 330 is connected to an auto remediation tool 345, where the auto remediation tool 345 can identify and collect information for previous cases where issues were reported and subsequent remediation actions were taken, allowing the solution to rely on historical data and provide options for auto-remediation actions to be performed to recover or improve the state of the cloud platform 301 and/or any of the services running on the cloud platform 301 back to a healthy state.

The monitoring server 310 can include a degradation engine 335, which may be substantially the same as the degradation engine 815 of FIG. 8 described below. The degradation engine 335 can be associated with logic to collect metrics data related to the performance of the cloud platform 301 and the running services on the cloud platform 301. The degradation engine 335 can monitor trends of the performance of the cloud platform and services and identify potential issues due to predictions based on determinations of differences between the current performance and identified trends which may indicate an issue has arisen or could arise. Further, the monitoring server 310 can collect data for experienced issues and actions taken in response in an effort to remedy those experienced issues. Thus, based on identifying an issue or predicting that an issue is to be experienced, countermeasures can be implemented, in some instances automatically. In some instances, an auto-remediation procedure can be automatically triggered to perform remediation actions identified in information extracted from historical data for issues experienced at the cloud platform, where those remediation actions were previously used in those prior instances to remedy a similar issue as the current identified issue at the cloud platform.

In some instances, the monitoring server 310 is connected with remediation parties that can be contacted to perform actions based on identified root cause issues according to the root cause analyzer 340 logic. The remediation parties 351 can include users of the cloud platform and/or users of a respective service running on the cloud platform (e.g., administrator, super-user) who can take responsive actions to fix an issue. The remediation parties 351 can also or alternatively include communication tools 365 to provide notifications for identified state of services and/or identifies issues at service. The remediation parties 351 can further or alternatively include automatic recovery procedures 360 that can be triggered through the monitoring server 310, for example, through the auto remediation tool 345. The execution of an automated recovery procedures 360 can be configured based on trained models defined according to historic data for performed recovery procedures at the cloud platform 301. The remediation parties 351 can further or alternatively include issue ticketing system 355 that can be used for management of issues and tasks to be performed at the cloud platform 301 to remedy experienced issues, or to perform protective steps to overcome experiencing an issue or reduce the impact of the issue.

Figure 4:
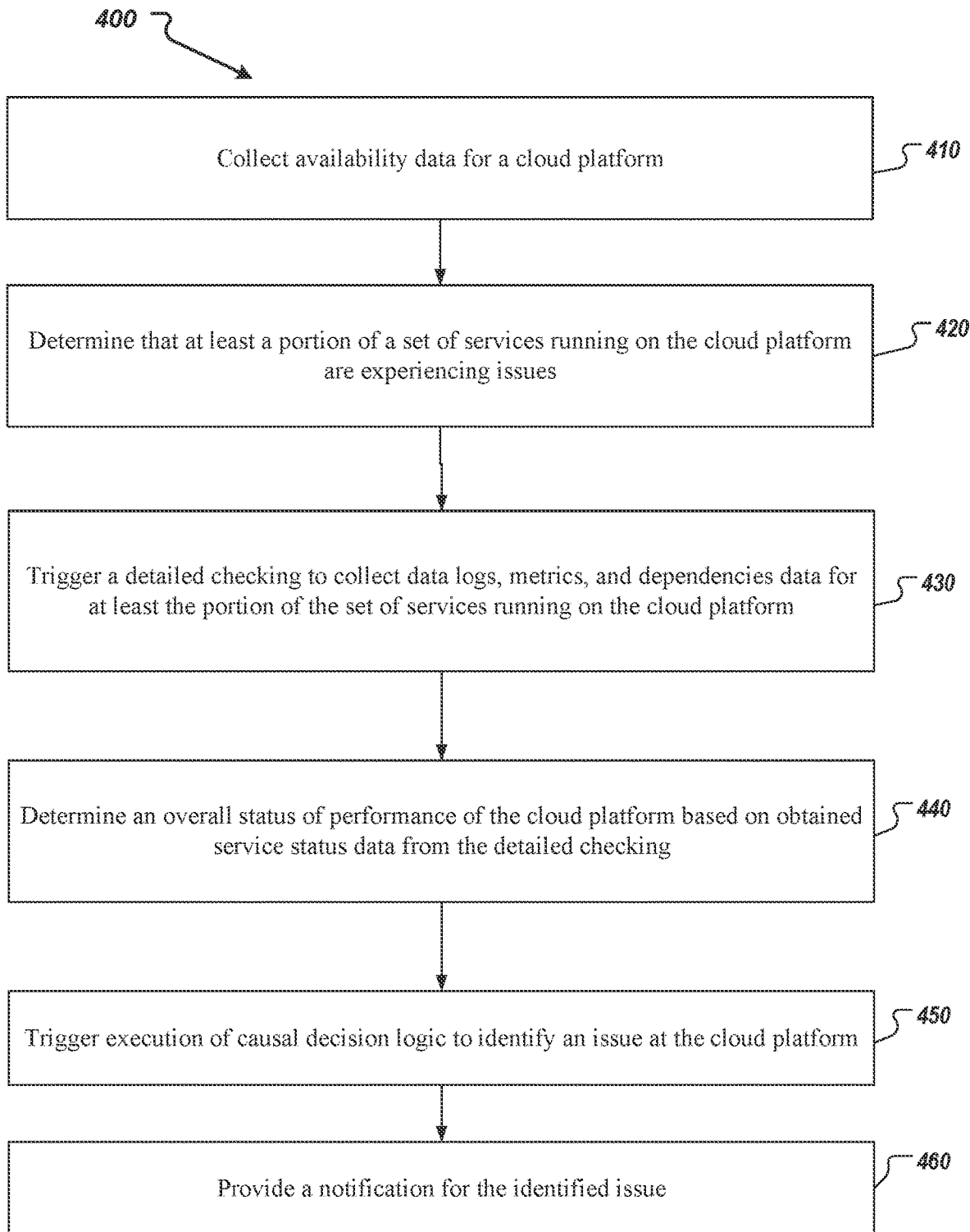
FIG. 4 is a flowchart for an example method for identifying issues in central service components running in a cloud platform in accordance with implementations of the present disclosure.

FIG. 4 is a flowchart for an example method 400 for identifying issues in central service components running in a cloud platform in accordance with implementations of the present disclosure. In some implementations, the method 400 can be executed in a cloud environment and/or in association with monitoring of services at a cloud environment. Method 400 can be executed at a monitoring automation server, such as the monitoring automation server 115 of FIG. 1 or the monitoring server 310 of FIG. 2, as well as in other suitable locations and systems.

At 410, availability data for a cloud platform is collected.

In some implementations, collecting the availability data for the cloud platform includes collecting availability statuses for monitors set up for the set of services running on the cloud platform. In some instances, each service may have its own monitor, while in others, one monitor may collect information for two or more services.

In some implementations, the collection of the availability data can be performed by obtaining availability status for services from monitors that are setup for those services. The monitors may determine a status defining whether a service is available or not without further providing details as to the availability issues that could have been experienced by the service.

In some instances, collecting the availability data can also include performing direct status checks of statuses of monitors instantiated for the set of services running on the cloud platform. In some instances, network issues for one or more services can be determined based on the direct status checks. The direct checks can be performed through monitors associated with the one or more services, where the monitors can provide data to identify network issues.

At 420, at least a portion of a set of services running on the cloud platform are determined to experience issues (e.g., network connectivity issues, downtime, other). The determination of at least the portion of the set of services is performed based on evaluation of the availability data. The collection and the evaluation of the availability data can be substantially similar to the availability checks performed by an availability checker, such as the availability checker 205 of FIG. 2 or the availability checker(s) 305 of FIG. 3. Further, the collection and evaluation of availability data can be performed as described below in relation to FIG. 5 and performed by a monitoring server 505. Alternative suitable collection and evaluation operations may also be used.

At 430, a detailed check is triggered to collect data logs, metrics, and dependencies data for at least the portion of the set of services running on the cloud platform.

At 440, an overall performance status of the cloud platform is determined based on the service status data obtained from the detailed check.

At 450, execution of causal engine logic to identify an issue at the cloud platform is trigged based on analysis of the overall status of performance of the cloud platform.

At 460, a notification for the identified issue is provided.

In some instances, based on an identified issue, a root cause analysis can be triggered to identify a root cause issue at a service on the cloud platform. The root cause analysis can include performing data correlation based on data for identified issues at one or more services on the cloud platform.

In some instances, information for registered outages at the cloud platform can be stored together with data for reported issues and identified root cause issues for those that were reported. In some instances, a previous outage at the cloud platform can be identified, where the previous outage corresponds to the identified issue. The previous outage is identified based on evaluation of historical log data for previous occurrences of issues at the cloud platform. In some instances, the notification that is provided at 460 can be a notification to perform such analyzes of historical outage data.

In some implementations, as part of the analysis of the previous outage data, information about the identified previous outage and corresponding remediation actions applied to remedy the outage can be extracted. The extracted information can be from historical log data for the cloud platform including (i) health statuses of services of the cloud platform at different time occasions when a respective outage was identified and (ii) remediation actions that were performed in an attempt to remedy the outage, wherein the remediation actions are associated with one or more services of the cloud platform.

In some instances, an auto-remediation procedure can be used to perform the remediation actions identified in the extracted information, thereby automatically attempting to remedy the currently identified issue at the cloud platform.

Figure 5:
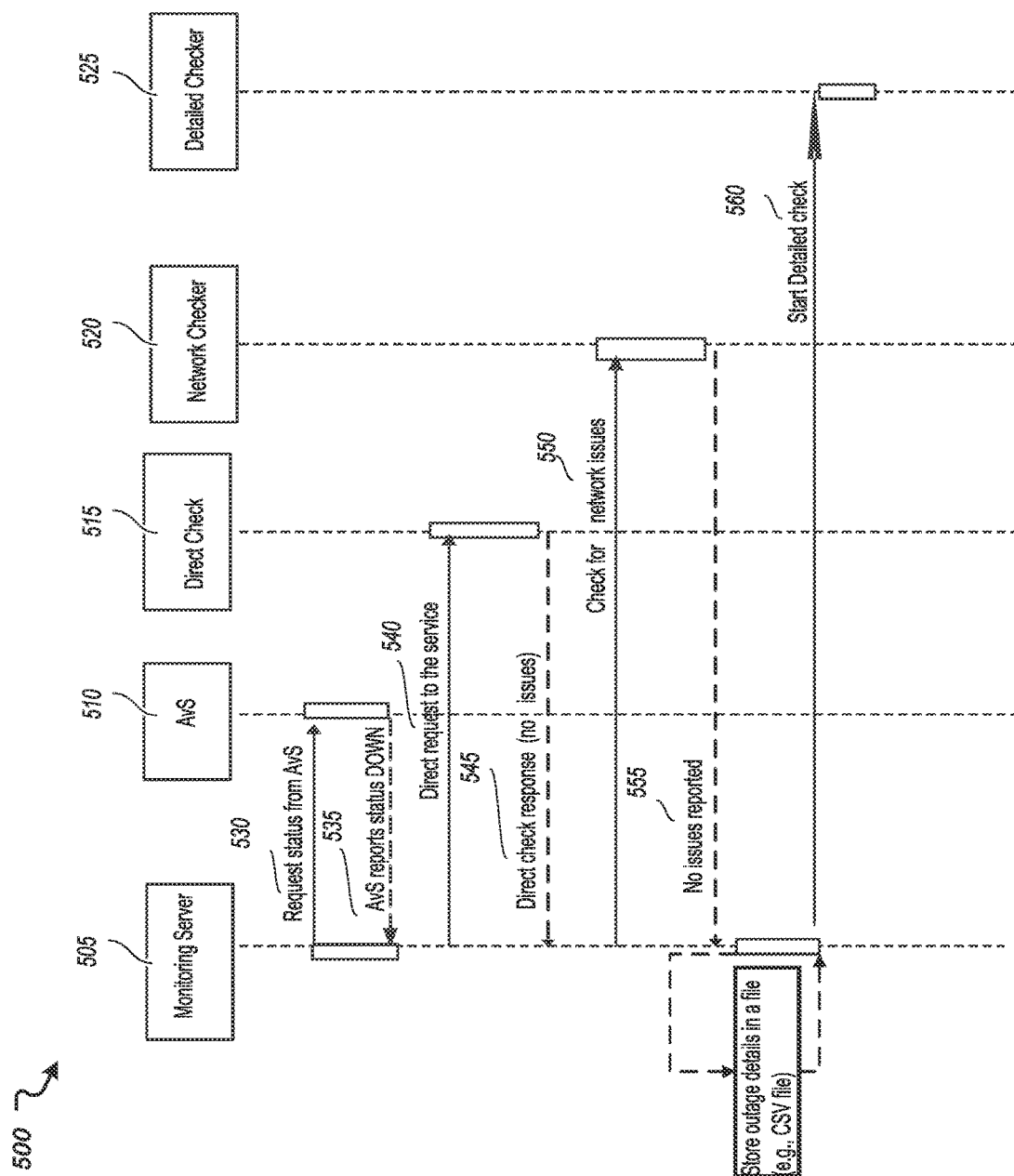
FIG. 5 is a sequence diagram for an example method for identifying an availability status of services running in a cloud platform in accordance with implementations of the present disclosure.

FIG. 5 is a sequence diagram for an example method 500 for identifying an availability status of services running in a cloud platform in accordance with implementations of the present disclosure.

Method 500 can be executed at a cloud environment as described in relation to FIG. 1 and FIG. 2. Method 500 describes obtaining availability data for services running on a cloud platform, where the obtaining is performed through obtaining data from monitors established to collect status information for services on the cloud platform.

A monitoring server 505 can include logic to perform availability checks, such as, for example, described for the availability checker of the monitoring server 310 of FIG. 3. The monitoring server 505 may, at 530, request to obtain an availability status of a cloud landscape (e.g., including a service, a set of services, a portion of a cloud platform, such as a data center, other). The request 530 is directed to availability services 510 that can provide information from monitors dedicated to respective services running on the cloud landscape. In some implementations, the availability service is located outside of the platform landscape (e.g., outside a data center hosting service) and can mimic actions of opening network locations (e.g., URLss) to access resources that are not running inside the same platform landscape. These monitors may collect and evaluate data for services running on a cloud platform in the cloud landscape, and may be specific to a single service, or may monitor a plurality of services at once. The availability services 530 can provide, at 535, a report for the status of respective services, which, for example, may determine a status of UP or DOWN. In cases where a status is determined to be associated with unavailability, the monitoring server 505 can send, at 540, a direct request for the availability of a particular service on the cloud platform. For example, the request at 540 can be directed to a monitoring tool (e.g., a direct checker) that can separately perform direct requests to the service. At 545, a response to the requests for the service's status can be obtained, and the monitoring server 505 can further check, at 550, for network issues at one or more service of the cloud platform. For example, checking for network issues can be performed through requests sent by a network checker application 520, where the network checker application 520 can be instantiated outside of the cloud platform and can monitor the network connectivity issues of services running on the cloud platform. In some instances, the network checker application 520 can provide a response (illustrated at 555) that includes the network connectivity status for a service on the cloud platform. In some implementations, multiple requests can be performed by the monitoring server 505 to track the availability, health, or network status of some or all of the services running on the cloud platform that is monitored.

In some implementations, the monitoring server 505 can obtain the reported data from the availability services 510, the direct checks 515, and the network checkers 520, and can determine whether the data collected for this issue is sufficient to require further detailed checks of experienced issues. For example, the collected data can be evaluated to identify an existing pattern in the behavior of some or all of the services, where the pattern is associated with a corresponding probability for experiencing an outage at the cloud platform. At 560, the monitoring server 505 can send a request for detailed checks to a set of detailed monitoring tools 525, such as the detailed monitoring checkers 300 of FIG. 3.

In some implementations, the performed checks can be run according to a predefined time schedule, for example, on regular time internals (e.g., every minute, every five minutes, etc.).

FIG. 6 is a sequence flowchart for an example method 600 for identifying a detailed health status of services running in a cloud platform to identify issues based on known patterns in accordance with implementations of the present disclosure.

The method 600 can be executed at a cloud environment as described in relation to FIGS. 1, 2, 3, 4, and 5. The method 600 describes obtaining detailed data for services running on a cloud platform. For example, the obtaining can be triggered based on an execution of the method 500 of FIG. 5, where it is determining that further detailed checks should be performed to identify issues at services running on the cloud platform (see 560 of FIG. 5).

The detailed data can include log data, metrics, and dependencies data for services running on the cloud platform. In some instances, the method can be executed by service checkers as described at FIG. 2 and FIG. 3.

A service checker 605 can be instantiated at a monitoring server, such as the monitoring server 310 of FIG. 3, to perform detailed checks for a predefined service running on the cloud platform. The monitoring server can, in some instances, be a separate standalone platform outside of the cloud platform. In some implementations, method 600 includes operations to perform detailed checks for statuses of a service that is monitored by multiple monitoring tools, including a direct check 610, an log checker 615, a Get metrics application 620, and a efficiency tracker 630, where information from some or all of these tools are used to determine a status of performance of the service. In some implementations, a monitoring server can include multiple service checkers that can be defined for multiple services that are monitored. Data from multiple service checkers can be consolidated and provided to a causal engine 640 to determine a root cause issue for experienced issues at the cloud platform.

At 635, the service checker 605 performs a direct request to a direct checks service 610 that is connected to the predefined service. The direct checks service 610 can execute a request to the service to determine its status based on the request 635. The direct checks service 610 can provide, at 640, a response as received from the service to the service checker 605. The service checker 605 can send a request 645, in parallel or sequentially to the request 635 that is a request to an elastic search checker 615 to identify a health status of the service that was checked. At 650, a response from the elastic search checker 615 is received at the service checker 605.

At 655, a request to an efficiency tracker 625 is performed. The efficiency tracker 625 can be a monitor that tracks the performance of the service. The efficiency tracker 625 can monitor the infrastructure of the service and monitor key performance indicators of the service. At 660, the efficiency tracker 625 can report performance issues that are noticed at the service. The obtained data from the requests 635, 645, 655, and 665 can be stored in a log file with detailed status data for the service. The storage of the detailed status data can, in some instances, be substantially the same as the described performance of detailed checks and logging of detailed status data at FIG. 2, operations 230 and 235.

At 675, once data is obtained from the executed four checks, either in parallel, sequentially, or combination therefore, the obtained data is provided to a causal engine 630 to evaluate the data to determine known patterns in the status data for the service and/or for multiple services, including the predefined service for the service checker 605, to determine a root cause of identified issues (e.g., performance issues, connectivity issues, availability issues, others) at service in the cloud platform.

The checks as described in FIG. 6 can be performed on regular time intervals or according to a predefined scheme for check execution, where the requests 635, 645, 655, and 655, can be iteratively performed to monitor the status of the predefined service. In some instances, these checks can be triggered based on evaluation of availability data for services on the cloud platform, as described in relation to the initiation of detailed checks at 560 of FIG. 5.

Figure 7:
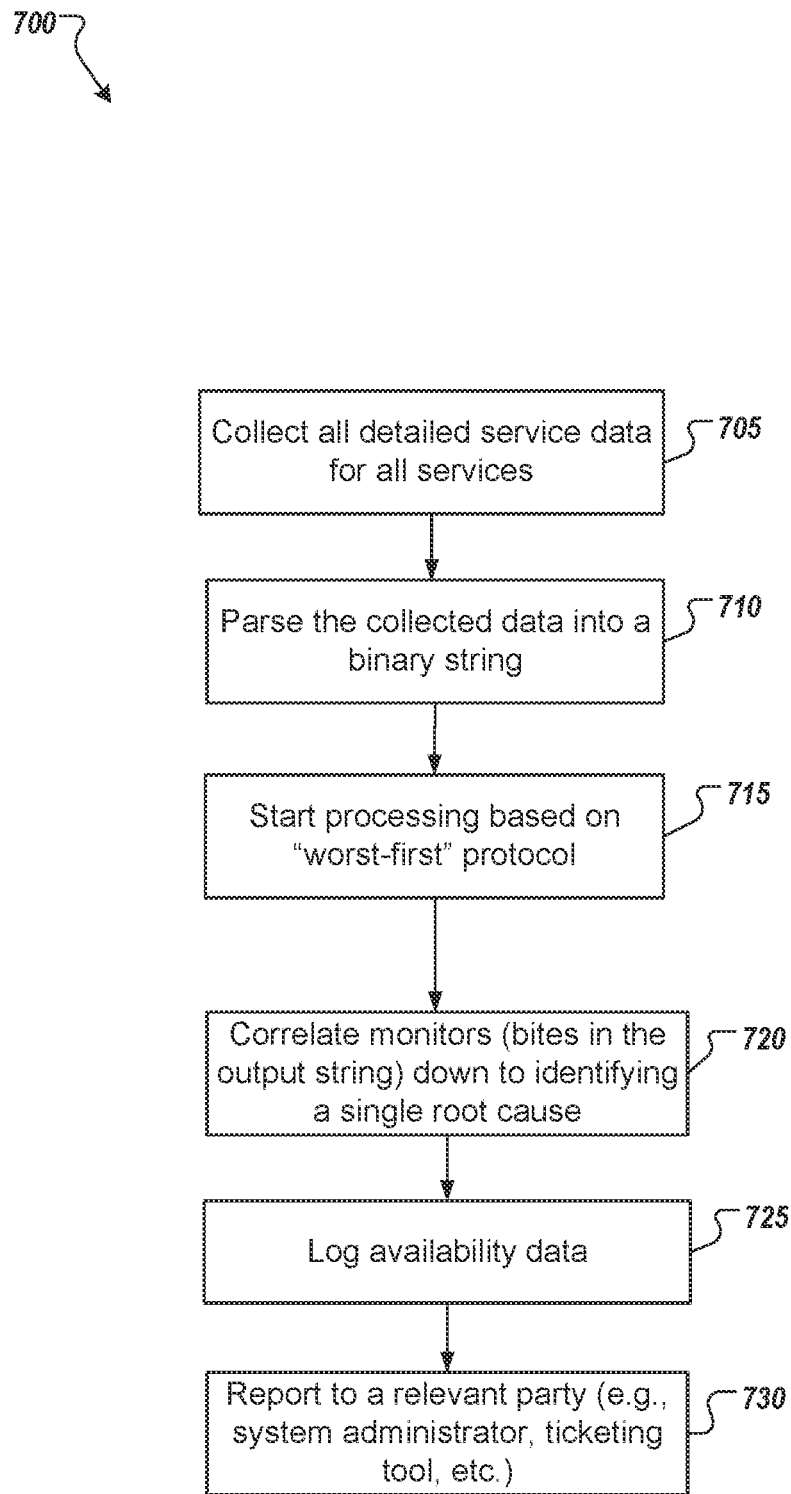
FIG. 7 is a flowchart for an example method for processing monitoring status generated based on data collected for services running in a cloud platform according to a "worst-first" processing algorithm in accordance with implementations of the present disclosure.

FIG. 7 is a flowchart for an example method 700 for processing monitoring status generated based on data collected for services running in a cloud platform according to a "worst-first" processing algorithm in accordance with implementations of the present disclosure.

Method 700 can be executed at a causal engine instantiated at a monitoring service as described in relation to FIG. 2, FIG. 3, FIG. 4, FIG. 6. Method 700 can be executed to identify issues at services running on a cloud platform, such as the cloud platform 301 of FIG. 3, cloud environment 106 of FIG. 1, or as discussed throughout this document.

At 705, the causal engine collects detailed service data from service checkers, such as the service checker 605 of FIG. 6. The collected data is detailed status data for services running on the cloud platform, as discussed in relation to the service checkers at FIG. 2, FIG. 3, and FIG. 6.

In some instances, the data from the service checkers can be stored in a file according to a particular file format, such as a JSON file. The data from the different files can be consolidated at the causal engine and the availability data, log data, metrics data, events data, or other health status data can be provided to the causal engine.

At 710, the collected data is parsed and a binary string with an overall status for all services is created. The binary string represents an output from the processing of the service data that indicates each service with a binary value status, either 0 or 1, to represent whether there are issues identified at one or more services.

In some implementations, the binary string can represent an overall status of the performance of the cloud platform. The string can represent the whole landscape as state of the services, where the string can be divided into string components that relate to services of different critical service level. For example, the binary string can have a structure as presented in example (1)—globalLandscapeDependencies: MostCriticalServices:CriticalServices:LessCriticalServices: LeastCriticalServices.

For example, the output binary string as an overall status of the cloud platform can be presented as in the example binary output (2):

(2)  000000000:0001111100001000:0000000111110000: 0000001000

A first portion of the binary string can include an output binary value that represents the health status of authentication services and the network status of the cloud platform, where such status can be relevant and affect at least some of the subsequently checked services. Subsequent portions of the binary string can include separate statuses of each of the sets of services monitored at the cloud platform. In some instances, the separate statuses of each of the set of services as included in the overall status binary string can be ordered as subsets of statuses, where a subset of statuses corresponds to a respective subset of services of the cloud platform having a respective critical status level. The subsets of status can be included in the overall status in decreasing order of respective critical levels of the corresponding subset of services provided by the cloud platform.

At 715, the output binary string is processed according to a "worst-first" protocol. The analysis of the overall status of the performance of the cloud platform comprises a causal analysis of the output binary string to evaluate the subsets of statuses (e.g., divided with a semi-column or other divider in the output result) in a worst-first order until a root cause of an issue at the cloud platform is identified. In some instances, the output binary string has the statuses grouped in the order of their critical level, and the processing of the string is performed based on such order, and thus the order can be referred to as "worst-first" order. In such cases, the evaluation is performed according to the worst-case scenario first, which is the first string component of the binary string, e.g., the global landscape dependencies component according to the example structure of the string (1) which can correspond to the example string 000000000 (i.e., that indicates no issues being detected as it includes only 0). Thus, a first evaluated string component that is associated with the services that are of the highest critical value can be evaluated to determine whether there are issues, and if there are no issues, processing of further string components can be performed to determine whether and what are the issues at the cloud platform. The evaluation of the binary string can be performed through regular expressions for matching of corresponding bits for the determined states for services identified by a respective string component from the binary string.

The statuses of different services can be compared and evaluated to determine whether there are identified patterns in the observed behavior to recognize a root cause issue of an experienced issue, such as a network outage, system overloading, or other. Based on processing of the output binary string in the "worst-first" order, scope of an outage can be determined, and one or more services associated with the outage can be identified.

For example, a first component of the binary string can be evaluated to determine whether there is a global network outage, and if there is no global network outage, a next critical service can be checked as reflected in a next, second component of the binary string. Such processing can be performed in stages and in the decreasing order of the criticality of provided services by the cloud platform.

The bits from the output binary overall status correspond to different service on the cloud platform, and define whether there is an issue or not at the service, based on the binary value (1 or 0). At 720, the bits can be correlated to identify a single root cause for experienced issues at the cloud platform.

At 725, availability data for the evaluated services can be logged, for example, in substantially similar manner as described for logging availability data and status data at FIG. 2.

A root cause issue can be determined based on the correlation of bits data from the output overall status string for the cloud platform.

At 730, based on the identified root cause issue, a relevant party can be notified for the identified root cause, such as a system administrator, a ticket can be logged at a ticketing system for tracking issues, and an auto-remediation tool can be invoked to resolve the issue, among other example reporting or alerting steps related to the identified root cause issue.

Degradation Engine Execution Triggering Alerts for Outages

In some instance, services at a cloud platform can be monitored to observe their patterns and behavior and to define models to support prediction of expected future events, such as technical issues and/or outages, based on differences between expected trends and current observed behavior.

Figure 8:
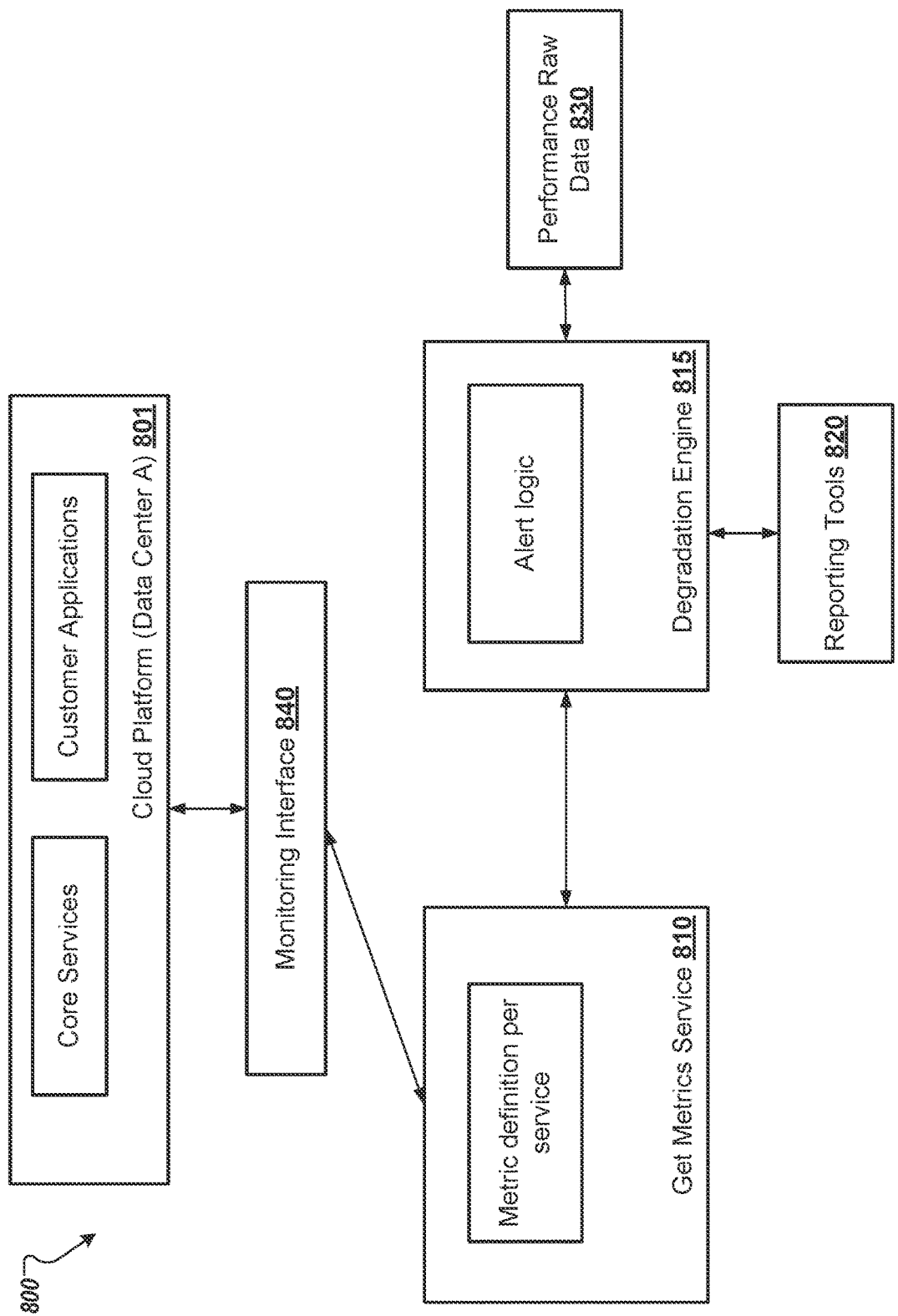
FIG. 8 is a block diagram of an example system for monitoring data for performance of a cloud platform in accordance with implementations of the present disclosure.

FIG. 8 is a block diagram of an example system 800 for monitoring data for performance of a cloud platform in accordance with implementations of the present disclosure.

The example system 800 includes a cloud platform 801 which, in some cases, may be substantially similar to the cloud platform 301 of FIG. 1, where core services are provided and can be consumed by customer applications.

The performance of the cloud platform 801 and the services and applications on the cloud platform 801 can be monitored to identify issues or to predict expected outages, and can be used to overcome issues and to take countermeasures. In some instances, the performance of the cloud platform 801 can be tracked based on configured metrics. In some instances, a service running on the cloud platform 801 can be configured to be monitored based on a set of metrics that can be tracked over time to determine trends for and potential issues with the performance of the service.

In some instances, infrastructure metrics data for performance of the infrastructure of the cloud platform and service metrics data for services running on the cloud platform can be collected and monitored to determine a relative performance of the cloud platform and its services. Further, trends in performances of the services can be identified, where those trends can be used in comparison with current performance rates to predict an expected or potential upcoming outage at one or more services, or at the cloud platform as a whole.

In some instances, a monitoring interface 840 can be provided to facilitate collection of metrics data from the cloud platform 801 into a get metrics service 810, where the get metrics service 810 obtains metrics data for the infrastructure of the cloud platform and for some or all of the services and/or applications running on the cloud platform 801. In some instances, each service can be set up with different metrics to be observed.

In some instances, a degradation engine 815 is communicatively coupled to the get metrics service 810, and consumes the monitored metrics data for the performance of the cloud and the services and applications. The degradation engine 815 implements logic to obtain metrics data from some or all services running on the cloud platform and to calculate exponential moving averages of some or all of the metrics data to determine trend changes based on observed historic data collected by the get metric service 810. By calculating trend changes in performance of services and comparing those trend changes with currently observed performance (e.g., based on collected current data from the get metric service 810), the solution can predict outages prior to their occurrences and trigger alerts to resolve issues before experiencing outages or while experiencing outages to diminish the effect of the issues on the scope of the outage.

In some instances, performance data for services running on the cloud platform 801 can be stored at performance raw data storage 830, where that data can be used to calculate the trends of the performance. Once an outage is predicted, the expected outage can be reported via a reporting tool from reporting tools 820. In some cases, based on the probability of a predicted outage and/or the significance of the effect of such a potential outage on the cloud platform, different reporting tools can be used. For example, outages that are expected with higher probability and with a significantly high impact on the overall performance of the cloud platform can be reported with a reporting tool that is defined for such use cases. In some instances, each reporting tool can be preconfigured for different scenarios of expected outages. In some instances, the determination of the significance of the impact of an expected outage can be based on a determination of the scope of the outage on the overall landscape of the cloud platform and comparing that with threshold values to categorize the impact to high, medium, low, or other level of service issue.

In some instances, the difference between expected trends in the behavior of a service (e.g., CPU consumption, load of threads, etc.) and the current behavior of the service can be associated with different levels of alerts. The difference can be classified and/or compared with threshold levels of alerting to indicate that some differences are to be treated with priority due to an expected impact of an outage on the cloud system and/or the higher probability of an issue to reduce the performance of the cloud platform (e.g., lead to downtime for the platform as a whole, lead to unavailability of some services, delayed responses, poor user experience, other performance drawbacks).

Figure 9:
FIG. 9 is a graph diagram for an example trend monitored at a service running on a cloud platform.

FIG. 9 is a graph 900 of an example trend monitored at a service running on a cloud platform.

The graph 900 plots metrics data collected for the performance of one or more services running on a cloud platform. For example, the metrics data can be metrics data collected during a detailed checking of the status of services, as described in relation to FIG. 6. For example, the collected metrics data can be collected from a get metrics application, such as the get metrics application 620 of FIG. 6.

The collected metrics data can be used to calculate trends. In some implementations, thresholds can be configured for monitoring the trends, and if a trend is breaching a certain threshold for a specific metric, then progressive alerting can be performed. In progressive alerting, the trend can be monitored to determine how it evolves, and the alerts can be escalated to subsequent levels. For example, in the first stage of alerting, messages can be created in a communication tool associated with the monitoring, and, in the second stage, a call to a system administrator or a maintenance service configured to handle issues (e.g., network outages) can be performed.

As shown in FIG. 9, line 910 shows plotted values from observations of metrics for a service. These plotted values can be considered as raw data consumed from a monitoring service that evaluates the performance and execution of a particular service. The line 920 represents a trend line calculated based on the observed metrics at 910.

In some instances, the trend is computed as an exponential moving average metric that weights higher more recent data from the evaluated metric data compared to older data.

Figure 10:
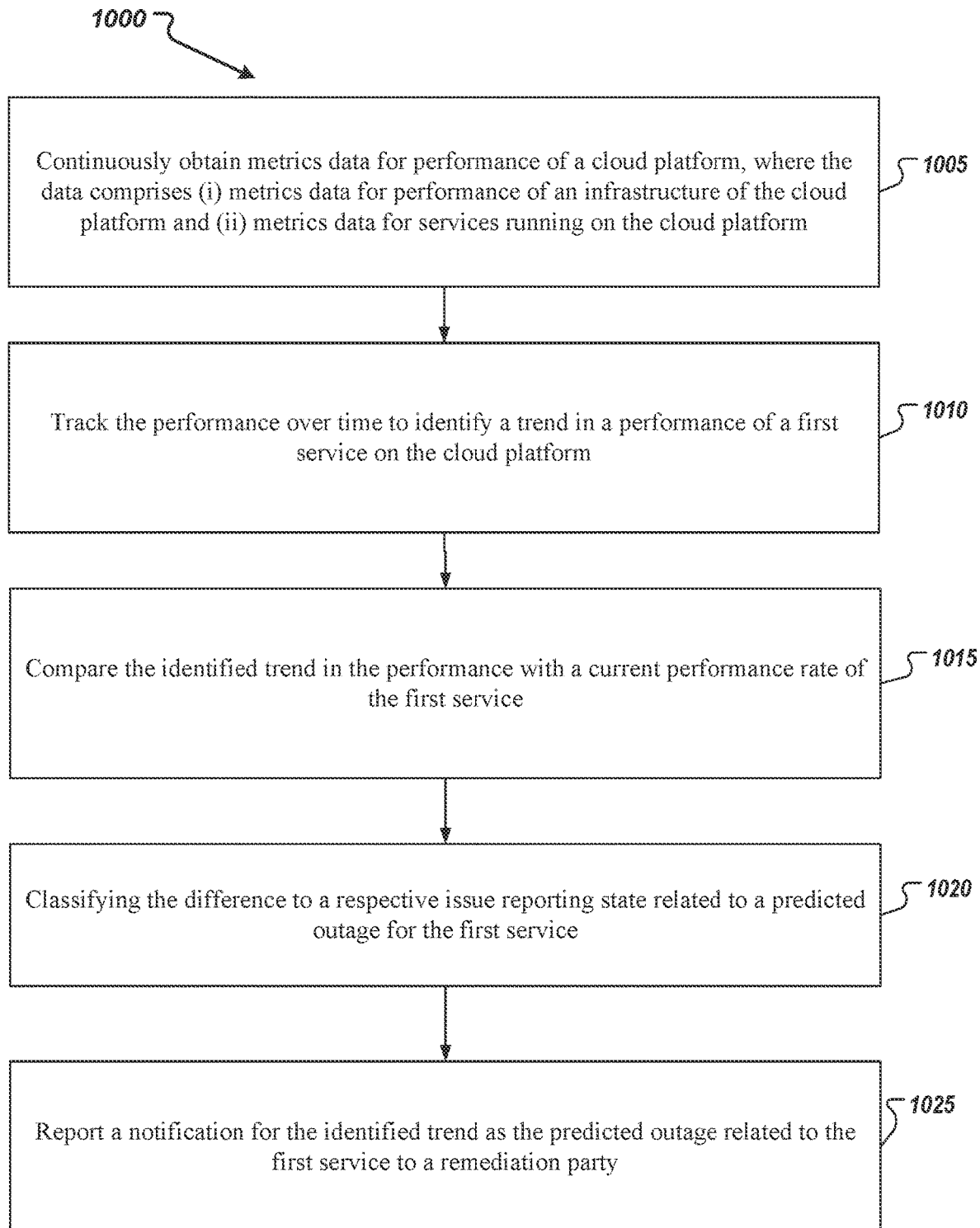
FIG. 10 is a flowchart for an example method for identifying expected outages based on continuous data evaluation to identify trends in behavior of service execution on a cloud platform in accordance with implementations of the present disclosure.

FIG. 10 is a flowchart for an example method 1000 for identifying expected outages based on continuous data evaluation to identify trends in the behavior of service execution on a cloud platform in accordance with implementations of the present disclosure. Method 1000 can be executed at the cloud environment 300 of FIG. 3, for example, at degradation engine 335, or at cloud environment 800, for example, at degradation engine 815.

Method 1000 can be executed to monitor performance of services running on a cloud platform, and to predict occurrences of outages that can support taking proactive measure to reduce the effect of those occurrences on the performance of the cloud platform.

At 1005, metrics data associated with performance of a cloud platform can be continuously obtained. The metrics data can include infrastructure metrics data for performance of the infrastructure of the cloud platform and service metrics data for services running on the cloud platform. The infrastructure metrics data for the performance of the infrastructure of the cloud platform can include data for a CPU load of virtual and physical machines providing infrastructure environment of the cloud platform At 1010, the performance of the cloud platform is tracked over time to identify a trend in a performance of a first service on the cloud platform. The tracking is based on evaluation of the obtained metrics data.

At 1015, the identified trend in the performance is compared with a current performance rate of the first service. In some instances, the current performance of the first service is determined based on the continuously obtained metrics data comprising service metrics data for the first service.

At 1020, a difference between the current performance rate and the identified trend of the first service can be evaluated. The evaluation can be used to classify the difference into an issue-reporting level associated with a prediction for an outage at the first service.

At 1025, a notification is reported to a remediation party to notify of the identified trend as the predicted outage related to the first service to a remediation party is reported. The reporting corresponds to the issue-reporting level associated with the predicted outage. The notified remediation party can be selected from a group of parties, such as the remediation parties 351 of FIG. 3. Each of the remediation parties can be associated with a different issue-reporting level matching the likelihood of occurrence of the predicted outage at the first service, and/or, a level of severity of the predicted outage on portions or all of the system. For example, issues can be categorized based on predefined rules into a reporting level. For example, issues that are associated with a low probability of being experienced, may be categorized into a reporting level that is mapped to reporting at one or more remediation tools that are not associated with critical cases. In another example, if an issue is associated with high probability of being experienced, it can be categorized into a reporting level that is mapped to tools with high priority of execution and can trigger immediate remediation actions.

Figure 11:
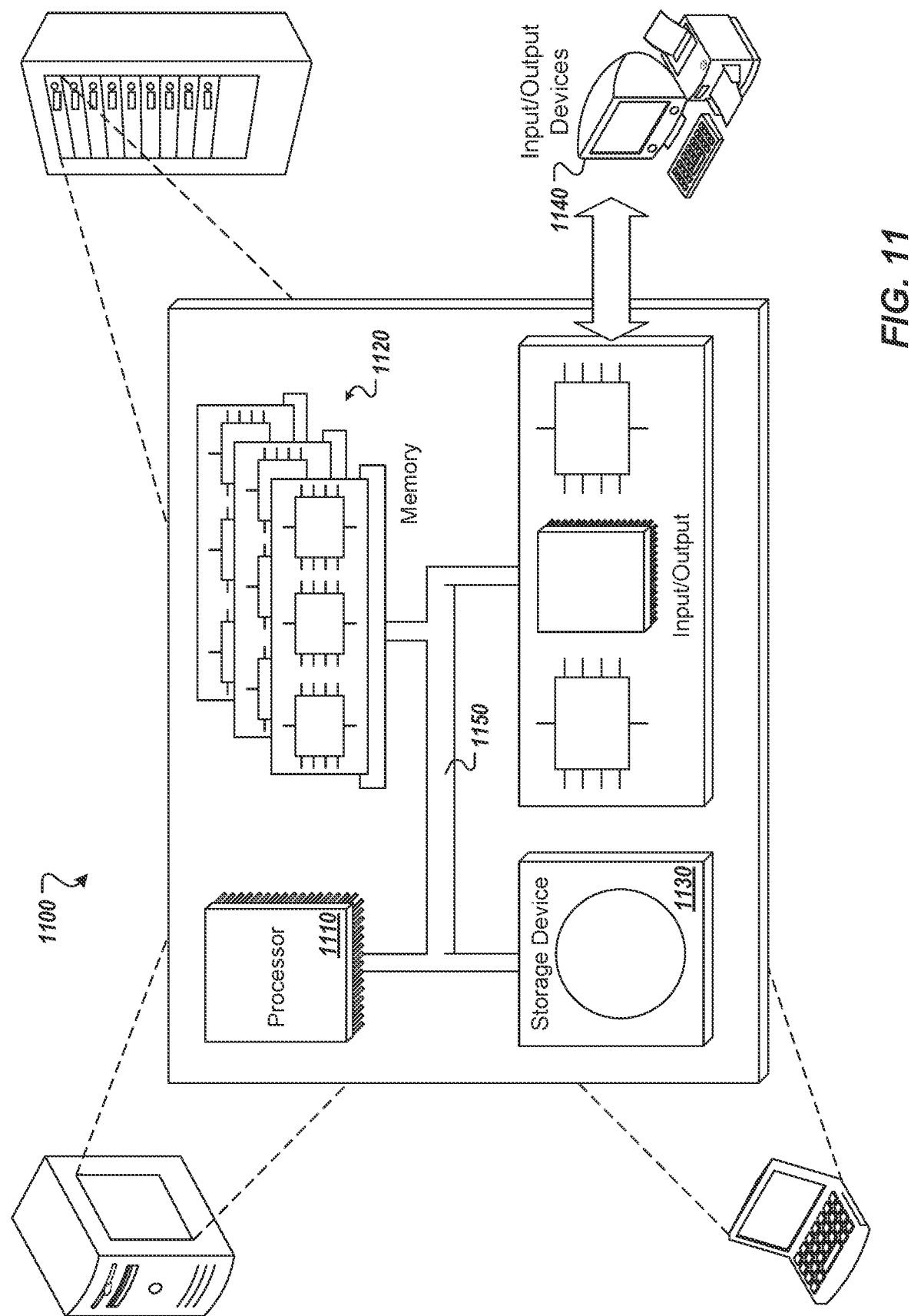
FIG. 11 is a schematic illustration of example computer systems that can be used to execute implementations of the present disclosure.

Referring now to FIG. 11, a schematic diagram of an example computing system 1000 is provided. The system 1100 can be used for the operations described in association with the implementations described herein. For example, the system 1100 may be included in any or all of the server components discussed herein. The system 1100 includes a processor 1110, a memory 1020, a storage device 1130, and an input/output device 1140. The components 1110, 1120, 1130, and 1140 are interconnected using a system bus 1150. The processor 1110 is capable of processing instructions for execution within the system 1100. In some implementations, the processor 1110 is a single-threaded processor. In some implementations, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In some implementations, the memory 1120 is a computer-readable medium. In some implementations, the memory 1120 is a volatile memory unit. In some implementations, the memory 1120 is a non-volatile memory unit. The storage device 1130 is capable of providing mass storage for the system 1100. In some implementations, the storage device 1130 is a computer-readable medium. In some implementations, the storage device 1130 may be a floppy disk device, a hard disk device, an optical disk device, or a tape device. The input/output device 1140 provides input/output operations for the system 1100. In some implementations, the input/output device 1140 includes a keyboard and/or pointing device. In some implementations, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of the multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also (alternatively) defined in accordance with the following examples:

Monitoring Service Health Statuses to Raise Alerts

Example 1. A computer-implemented method, the method comprising: collecting availability data for a cloud platform;
  based on evaluation of the availability data, determining that at least a portion of a set of services running on the cloud platform are experiencing issues;
  triggering a detailed check to collect data logs, metrics, and dependencies data for at least the portion of the set of services running on the cloud platform;
  determining an overall status of performance of the cloud platform based on obtained service status data from the detailed check;
  based on analysis of the overall status of performance of the cloud platform, triggering execution of causal engine logic to identify an issue at the cloud platform; and
  providing a notification for the identified issue.

Example 2. The method of Example 1, wherein collecting the availability data for the cloud platform comprises:
  collecting availability statuses for monitors set up for the set of services running on the cloud platform.

Example 3. The method of Example 1 or Example 2, wherein determining that at least a portion of the set of services are experiencing issues comprising:
  evaluating the availability data of the cloud platform to determine that a status of a monitor for a service running on the cloud platform indicates an outage, wherein the availability data includes data collected from the monitor for the service.

Example 4. The method of Example 3, wherein collecting the availability data for the cloud platform comprises:

performing direct status checks of statuses of monitors instantiated for the set of services running on the cloud platform; and determining whether network issues are associated with at least one of the services.

Example 5. The method of Example 4, wherein performing direct status checks of the statuses of the monitors comprises performing an internal landscape check of services running on the cloud platform.

Example 6. The method of any of the preceding Examples, wherein the overall status of the performance of the cloud platform is determined as an output binary value that represents a health status of the cloud platform as a whole and separate statuses of each of the set of services monitored at the cloud platform.

Example 7. The method of Example 6, wherein the separate statuses of each of the set of services are included in the overall status as ordered subsets of statuses, where a subset of statuses corresponds to a respective subset of services of the cloud platform having a respective critical status level, and wherein the subsets of status are included in the overall status in a decreasing order of respective critical levels of corresponding subset of services provided by the cloud platform.

Example 8. The method of Example 7, wherein the analysis of the overall status of the performance of the cloud platform comprises a causal analysis of the output binary string to evaluate the subset of statuses in a worst-first order until a root cause of an issue at the cloud platform is identified.

Example 9. The method of any of the preceding Examples, comprising:

triggering a root cause analysis to identify a root cause issue at a service on the cloud platform by correlating data for identified issues at one or more services on the cloud platform.

Example 10. The method of Example 9, comprising:

identifying that a previous outage at the cloud platform that corresponds to the identified issue, wherein the previous outage is identified based on evaluation of historical log data for previously occurred issues at the cloud platform; and extracting information about the identified previous outage and corresponding remediation actions applied to remedy the outage, wherein the extracted information is from historic log data for the cloud platform including (i) health statuses of services of the cloud platform at different time occasions when a respective outage was identified and (ii) performed remediation actions that were applied to remedy the outage, wherein the remediation actions are associated with one or more services of the cloud platform.

Example 11. The method of Example 10, comprising:

triggering an auto-remediation procedure to perform the remediation actions identified in the extracted information to remedy the identified issue at the cloud platform.

Similar operations and processes as described in Examples 1 to 11 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 11 may also be contemplated.

Degradation Engine Execution Triggering Alerts for Outages

Example 1. A computer-implemented method, the method comprising:

continuously obtaining metrics data for performance of a cloud platform, where the data comprises (i) infrastructure metrics data for performance of an infrastructure of the cloud platform and (ii) service metrics data for services running on the cloud platform;

tracking, based on evaluation of the obtained metrics data, the performance of the cloud platform over time to identify a trend in a performance of a first service on the cloud platform;

comparing the identified trend in the performance with a current performance rate of the first service, wherein the current performance rate is determined based on the continuously obtained metrics data comprising service metrics data for the first service;

based on an evaluated difference between the current performance rate and the identified trend, classifying the difference into an issue-reporting level associated with a prediction for an outage at the first service; and based on the issue-reporting level, reporting a notification for the identified trend as the predicted outage related to the first service to a remediation party, wherein the remediation party is selected from a group of parties, each party being associated with a different issue-reporting level matching likelihood of occurrence of the predicted outage at the first service.

Example 2. The method of Example 1, wherein the first service running on the cloud platform is associated with a set of metrics that are evaluated to track performance over time.

Example 3. The method of Example 1 or Example 2, wherein the infrastructure metrics data for performance of the infrastructure of the cloud platform includes data for a CPU load of virtual and physical machines providing infrastructure environment of the cloud platform.

Example 4. The method of any one of the preceding Examples, comprising: configuring metrics for obtaining the metrics data for the performance of the cloud platform, wherein the metrics are defined per service on the cloud platform.

Example 5. The method of any one of the preceding Examples, wherein the identified trend is computed as an exponential moving average metric that weights higher more recent data from the evaluated metric data compared to older data.

Example 6. The method of any one of the preceding Examples, comprising:

triggering a root cause analysis to identify a root cause issue on the cloud platform associated with the notification for the identified trend as the predicted outage related to the first service.

Example 7. The method of Example 6, wherein triggering the root cause analysis comprises:

collecting availability data for the cloud platform;

determining that at least a portion of a set of services running on the cloud platform are experiencing issues based on an evaluation of the collected availability data;

triggering a detailed checking to collect data logs, metrics, and dependencies data for at least the portion of the set of services running on the cloud platform;

determining an overall status of performance of the cloud platform based on obtained service status data from the detailed checking;

triggering execution of causal engine logic to identify an issue at the cloud platform based on analysis of the overall status of performance of the cloud platform; and providing a notification for the identified issue.

Example 8. The method of Example 7, comprising:
triggering an auto-remediation procedure to perform remediation actions identified in information extracted from historical data for experienced issues at the cloud platform previously used to remedy the identified issue at the cloud platform.

Similar operations and processes as described in Examples 1 to 8 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 8 may also be contemplated.

What is claimed is:

1. A computer-implemented method, the method comprising:
collecting availability data for a cloud platform;
based on evaluation of the availability data, determining that a set of services running on the cloud platform are experiencing availability issues;
triggering a detailed check to collect data including data logs, metrics, and dependencies data for the set of services running on the cloud platform;
determining an overall status of performance of the cloud platform based on the collected data from the detailed check, wherein the overall status of the performance of the cloud platform is determined as an output binary string that represents a health status of the cloud platform as a whole, wherein the output binary string includes i) first binary values corresponding to each status of each service of the set of services to indicate respective and separate statuses of each of the set of services monitored at the cloud platform and ii) second binary values for health statuses of dependencies between at least two services from the set of services, wherein the binary values of the output binary string are organized in sets of strings of binary values, wherein the sets of strings are ordered within the output binary string according to a critical level of issues associate with services corresponding to a respective string including respective binary values for health statuses of the services;
based on determining the output binary string of the overall status of performance of the cloud platform, triggering execution of causal engine logic to evaluate subsets of the first binary values and the second binary values corresponding to subsets of statuses to identify a root cause of an issue at the cloud platform; and
providing a notification for the identified root cause.

2. The method of claim 1, wherein collecting the availability data for the cloud platform comprises:
collecting availability statuses for monitors set up for the set of services running on the cloud platform.

3. The method of claim 1, wherein determining that the set of services are experiencing issues comprising:
evaluating the availability data of the cloud platform to determine that a status of a monitor for a service running on the cloud platform indicates an outage, wherein the availability data includes data collected from the monitor for the service.

4. The method of claim 3, wherein collecting the availability data for the cloud platform comprises:
performing direct status checks of statuses of monitors instantiated for the set of services running on the cloud platform; and
determining whether network issues are associated with at least one of the services.

5. The method of claim 4, wherein performing direct status checks of the statuses of the monitors comprises performing an internal landscape check of services running on the cloud platform.

6. The method of claim 1, wherein the overall status of the performance of the cloud platform is determined as an output binary value that represents a health status of the cloud platform as a whole and separate statuses of each of the set of services monitored at the cloud platform.

7. The method of claim 1, wherein triggering the execution comprises evaluating the overall status of the performance of the cloud platform comprises a causal analysis of the output binary string to evaluate the subset of statuses in a worst-first order until the root cause of the issue at the cloud platform is identified.

8. The method of claim 1, comprising:
triggering a root cause analysis to identify a root cause issue at a service on the cloud platform by correlating data for identified issues at one or more services on the cloud platform.

9. The method of claim 8, comprising:
identifying that a previous outage at the cloud platform that corresponds to the identified issue, wherein the previous outage is identified based on evaluation of historical log data for previously occurred issues at the cloud platform; and
extracting information about the identified previous outage and corresponding remediation actions applied to remedy the outage, wherein the extracted information is from historic log data for the cloud platform including (i) health statuses of services of the cloud platform at different time occasions when a respective outage was identified and (ii) performed remediation actions that were applied to remedy the outage, wherein the remediation actions are associated with one or more services of the cloud platform.

10. The method of claim 9, comprising:
triggering an auto-remediation procedure to perform the remediation actions identified in the extracted information to remedy the identified issue at the cloud platform.

11. The method of claim 1, wherein a first-in-order string of binary values within the output binary string contains the second binary values for the health statuses of the dependencies between the services.

12. A non-transitory, computer-readable medium coupled to one or more processors and having instructions stored thereon which, when executed by the one or more processors, cause the one or more processors to perform operations, the operations comprising:
collecting availability data for a cloud platform;
based on evaluation of the availability data, determining that a set of services running on the cloud platform are experiencing availability issues;
triggering a detailed check to collect data including data logs, metrics, and dependencies data for the set of services running on the cloud platform;
determining an overall status of performance of the cloud platform based on the collected data from the detailed check, wherein the overall status of the performance of the cloud platform is determined as an output binary string that represents a health status of the cloud platform as a whole, wherein the output binary string includes i) first binary values corresponding to each status of each service of the set of services to indicate respective and separate statuses of each of the set of services monitored at the cloud platform and ii) second binary values for health statuses of dependencies between at least two services from the set of services, wherein the binary values of the output binary string are organized in sets of strings of binary values, wherein the sets of strings are ordered within the output binary string according to a critical level of issues associate with services corresponding to a respective string including respective binary values for health statuses of the services;

based on determining the output binary string of the overall status of performance of the cloud platform, triggering execution of causal engine logic to evaluate subsets of the first binary values and the second binary values corresponding to subsets of statuses to identify a root cause of an issue at the cloud platform; and providing a notification for the identified root cause.

13. The non-transitory computer-readable medium of claim 12, wherein collecting the availability data for the cloud platform comprises:

collecting availability statuses for monitors set up for the set of services running on the cloud platform.

14. The non-transitory computer-readable medium of claim 12, wherein determining that the set of services are experiencing issues comprising:

evaluating the availability data of the cloud platform to determine that a status of a monitor for a service running on the cloud platform indicates an outage, wherein the availability data includes data collected from the monitor for the service.

15. The non-transitory computer-readable medium of claim 14, wherein collecting the availability data for the cloud platform comprises:

performing direct status checks of statuses of monitors instantiated for the set of services running on the cloud platform; and determining whether network issues are associated with at least one of the services, wherein performing direct status checks of the statuses of the monitors comprises performing an internal landscape check of services running on the cloud platform.

16. The non-transitory computer-readable medium of claim 12, wherein a first-in-order string of binary values within the output binary string contains the second binary values for the health statuses of the dependencies between the services.

17. A system comprising
a computing device; and
a computer-readable storage device coupled to the computing device and having instructions stored thereon which, when executed by the computing device, cause the computing device to perform operations, the operations comprising:

collecting availability data for a cloud platform;

based on evaluation of the availability data, determining that a set of services running on the cloud platform are experiencing availability issues;

triggering a detailed check to collect data including data logs, metrics, and dependencies data for the set of services running on the cloud platform;

determining an overall status of performance of the cloud platform based on the collected data from the detailed check, wherein the overall status of the performance of the cloud platform is determined as an output binary string that represents a health status of the cloud platform as a whole, wherein the output binary string includes i) first binary values corresponding to each status of each service of the set of services to indicate respective and separate statuses of each of the set of services monitored at the cloud platform and ii) second binary values for health statuses of dependencies between at least two services from the set of services, wherein the binary values of the output binary string are organized in sets of strings of binary values, wherein the sets of strings are ordered within the output binary string according to a critical level of issues associate with services corresponding to a respective string including respective binary values for health statuses of the services;

based on determining the output binary string of the overall status of performance of the cloud platform, triggering execution of causal engine logic to evaluate subsets of the first binary values and the second binary values corresponding to subsets of statuses to identify a root cause of an issue at the cloud platform; and providing a notification for the identified root cause.

18. The system of claim 17, wherein collecting the availability data for the cloud platform comprises:

collecting availability statuses for monitors set up for the set of services running on the cloud platform.

19. The system of claim 17, wherein determining that the set of services are experiencing issues comprising:

evaluating the availability data of the cloud platform to determine that a status of a monitor for a service running on the cloud platform indicates an outage, wherein the availability data includes data collected from the monitor for the service.

20. The system of claim 19, wherein collecting the availability data for the cloud platform comprises:

performing direct status checks of statuses of monitors instantiated for the set of services running on the cloud platform; and determining whether network issues are associated with at least one of the services.

21. The system of claim 17, wherein a first-in-order string of binary values within the output binary string contains the second binary values for the health statuses of the dependencies between the services.

* * * * *